(12) United States Patent
Lee et al.

(10) Patent No.: US 6,506,228 B2
(45) Date of Patent: Jan. 14, 2003

(54) METHOD OF PREPARING PLATINUM ALLOY ELECTRODE CATALYST FOR DIRECT METHANOL FUEL CELL USING ANHYDROUS METAL CHLORIDE

(75) Inventors: Seol Ah Lee, Kwangju (KR); Kyung Won Park, Kwangju (KR); Boo Kil Kwon, Kwangju (KR); Yung Eun Sung, Kwangju (KR)

(73) Assignee: Kwangju Institute of Science and Technology, Kwangju (KR)

( * ) Notice: Subject to any disclaimer, the term of this patent is extended or adjusted under 35 U.S.C. 154(b) by 0 days.

(21) Appl. No.: 09/814,746

(22) Filed: Mar. 23, 2001

(65) Prior Publication Data

US 2001/0027160 A1 Oct. 4, 2001

(30) Foreign Application Priority Data

Apr. 4, 2000 (KR) .......................................... 2000-17511

(51) Int. Cl.$^7$ .................................................... B22F 9/24
(52) U.S. Cl. ............................................ 75/351; 420/590
(58) Field of Search .............................. 75/351; 420/590

(56) References Cited

U.S. PATENT DOCUMENTS 3,390,981 A  *  7/1968  Hoffman .......................... 75/351
5,308,377 A  *  5/1994  Bonnemann et al. .......... 75/351
5,786,026 A  *  7/1998  Seko et al. ............... 204/290.11

OTHER PUBLICATIONS

Abstract of JP 03283358 A, Hara, N. Dec. 13, 1991.*
George N. Glavee, et al.; Boride Reduction of Cobalt Ions in Water, etc. American Journal Society, 1993; pp. 162–169 No month.
T.A. Dorling & R.L. Moss; The Structure and Activity of Supported Metal Catalysts; Journal of Catalysts; 1996; pp. 111–115 No month.
Masahiro Watanabe, et al.; Preparation of Highly Dispersed Pt ' Ru Alloy, etc.; J. Electroanal. Chem.; 1987; pp. 395–406 No month.
Helmut Bonnemann, et al.; Formation of Colloidal Transition Metals in Organic Phases, etc.; Angew Chem. Int. Ed. Engl.; 1991; pp. 1312–1314 No month.

* cited by examiner

Primary Examiner—Roy King
Assistant Examiner—Tima McGuthry-Banks
(74) Attorney, Agent, or Firm—Rosenberg, Klein & Lee (57) ABSTRACT

A method for preparing a platinum alloy electrode catalyst for DMFC using anhydrous metal chlorides. The method includes reducing platinum chloride and non-aqueous second metal chloride with boron lithium hydride (LiBH$_4$) in a water-incompatible organic solvent in a nitrogen atmosphere to form nano-sized particles of colloidal platinum alloy, and drying the platinum alloy particles without any heat treatment. The method of preparing a platinum alloy catalyst according to the present invention makes it possible to prepare platinum alloy particles having a narrow range of size distribution and an average particle size of less than 2 nm with ease, relative to the conventional methods. The platinum alloy particles thus obtained can be used as an electrode catalyst for DMFC to enhance methanol oxidation performance.

8 Claims, 8 Drawing Sheets

---

(1) DISSOLVE METAL CHLORIDE IN THF (2) ADD CARBON BLACK IN THF TO (1)

(3) ADD LiBH$_4$ REDUCTANT (4) ADD SMALL AMOUNT OF ACETONE (5) REMOVE THF VIA VAPORIZATION (6) WASH WITH ETHANOL AND REMOVE ETHANOL (7) FREEZE DRYING

FIG. 1

(1) DISSOLVE METAL CHLORIDE IN THF (2) ADD CARBON BLACK IN THF TO (1)

(3) ADD LiBH$_4$ REDUCTANT (4) ADD SMALL AMOUNT OF ACETONE (5) REMOVE THF VIA VAPORIZATION (6) WASH WITH ETHANOL AND REMOVE ETHANOL (7) FREEZE DRYING

METHOD OF PREPARING PLATINUM ALLOY ELECTRODE CATALYST FOR DIRECT METHANOL FUEL CELL USING ANHYDROUS METAL CHLORIDE

BACKGROUND OF THE INVENTION

1. Field of the Invention

The present invention relates to a method of preparing a platinum alloy electrode catalyst for a direct methanol fuel cell (DMFC) using anhydrous metal chlorides and, more particularly, to a method of preparing a platinum alloy electrode catalyst for DMFC with minimized particle size from platinum chloride and a second metal chloride using a boron lithium hydride (LiBH$_4$) reductant and an organic water-incompatible solvent.

2. Description of the Related Art

DMFC is a non-pollutive energy source operable at a low temperature of below 100° C. and useful in a variety of applications, including power sources of non-pollutive vehicles, local generating and moving power source, etc. However, DMFC has a problem in that carbon monoxide (CO) generated as a by-product from oxidation of methanol causes a poisoning effect to the platinum used as an electrode catalyst of the fuel cell, thus deteriorating the oxidation performance of the methanol.

In an attempt to overcome the problem, many studies have been made on using a platinum-based alloy whose particle size is reduced with a small amount rather than pure platinum so as to minimize the poisoning effect to the platinum caused by carbon monoxide and achieve economical gains.

In regard to this, the conventional precipitation method for preparing an electrode catalyst for DMFC involves addition of various reductants (e.g., sodium formate, sodium thiosulfite, or nitrohydrazine) to an aqueous solution of metal chloride to form nano-order particles, which method is relatively simple in procedure but disadvantageous in regard to necessity of using water-soluble metal chlorides exclusively (References: N. M. Kagan, Y. N. Pisarev, Y. A. Kaller, V. A. Panchenko, *Elektrokhimiya*, 9, 1498 (1973); and C. N. Glavee, K. N. Klabunde, C. M. Sorensen, G. C. Hajipanayis, *Langmuir*, 9, 162 (1993)).

Another method is known that involves dispersion of a non-aqueous metal chloride in water together with carbon, drying the dispersed metal chloride, and then reduction of the metal chloride via heat treatment in the hydrogen atmosphere, which method has a necessity of heat treatment at a high temperature with a consequence of an increase in the particle size due to heat treatment, thus providing non-uniform particle size distribution (Reference: T. A. Dorling, R. L. Moss, *J. Catal.*, 5, 111 (1966)).

Further, a colloid method of preparing an electrode catalyst for DMFC in an aqueous solution has been proposed (Reference: Watanabe et al., *Journal of Electronal. Chem.*, 229, 395 (1987)). This method is a multi-step procedure involving addition of a reductant (e.g., Na$_2$CO$_3$ or NaHSO$_4$) to a hydrated platinum chloride (H$_2$PtCl$_6$.xH$_2$O) and an aqueous solution of a second metal chloride to form a metal composite intermediate, hydrolysis of the intermediate to form a metal oxide, and then heat treatment in the hydrogen atmosphere to produce nano-sized platinum alloy particles. However, the yield of the platinum alloy is significantly dependent upon controlling the types of reductants added in the respective steps and the change in the acidity (pH) between the steps. This method is also disadvantageous in regard to necessity of heat treatment in the hydrogen atmosphere in order to complete reduction and catalytic activity of the metal oxide.

Another colloid method of preparing an electrode catalyst for DMFC on a non-aqueous solution has been proposed (Reference: Bonnemann et al., *Angew. Chem. Int. Ed. Engl.*, 30(10), 1312 (1991)), which involves preparing a surfactant-stabilized catalyst using a synthetic tetrabutylammonium-based reductant, oxidizing the surfactant in the oxygen atmosphere and performing a heat treatment in the hydrogen atmosphere to remove the surfactant surrounding the catalyst. This method is advantageous in regard to uniform particle size of the catalyst around 2 nm and readiness of dispersion in carbon, but problematic in that the process is too complex and the heat treatment causes agglomeration to increase the particle size.

SUMMARY OF THE INVENTION

It is, therefore, an object of the present invention to provide a method of easily preparing a platinum alloy electrode catalyst for DMFC having an average particle size of less than 2.0 nm from platinum chloride and a non-aqueous solution of a second metal chloride using a boron lithium hydride (LiBH$_4$) reductant and an organic water-incompatible solvent without heat treatment.

To achieve the above object of the present invention, there is provided a method of preparing a platinum alloy electrode catalyst for a direct methanol fuel cell, which method includes the steps of: dissolving platinum chloride and non-aqueous second metal chloride in an organic water-incompatible solvent to prepare a platinum chloride solution and a second metal chloride solution, respectively; mixing the respective solutions to obtain a mixed solution; adding a boron lithium hydride (LiBH$_4$) solution to the mixed solution and subjecting the mixed solution to reduction reaction to form a platinum alloy powder; and collecting the platinum alloy powder from the mixed solution through drying.

DETAILED DESCRIPTION OF THE PREFERRED EMBODIMENT

Hereinafter, the present invention will be described in detail by way of the following examples and experimental examples, which are not intended to limit the scope of the present invention.

According to the platinum alloy preparation method of the present invention, the platinum chloride and the non-aqueous second metal chloride are mixed in a desired atomic percentage (%) of platinum and the second metal within the range satisfying a predetermined metal solubility. Preferably, the mixed solution includes the platinum chloride and the non-aqueous second metal chloride added to the organic water-incompatible solvent in an atom ratio of platinum to the second metal being 1~2:1. After partial heating and vigorous stirring for complete dissolution, a 0.01 to 0.5 M boron lithium hydride (LiBH$_4$) solution in a water-incompatible solvent is added to the mixed solution with continuous stirring to form nano-sized particles of colloidal platinum alloy.

To prepare a platinum alloy catalyst dispersed in a carbon support, a carbon black powder may be added to the inorganic water-incompatible solvent, with the carbon support added to the platinum alloy catalyst in a weight ratio of catalyst to support being 0~100:100~0.

Examples of the organic water-incompatible solvent include tetrahydrofuran (THF), acetonitrile (CAN), pyridine, dimethylformamide (DMF), etc. The solubilities of platinum chloride and non-aqueous second metal chloride are important factors that determine the alloy degree, particle size and crystallinity of the alloy particles. Thus, the platinum chloride and non-aqueous second metal chloride may be partially heated at 40 to 50° C. for 5 to 12 hours with vigorous stirring for the purpose of complete dissolution in the water-incompatible solvent.

The second metal used to form a platinum-based alloy is selected from a transition metal. Preferably, examples of the second metal chloride include ruthenium chloride, nickel chloride, molybdenum chloride, and tungsten chloride, which chlorides directly cause oxidation of methanol with high performance of the DMFC.

The metal chloride solution is stirred at 100 to 1200 rpm and the boron lithium hydride (LiBH$_4$) solution is added to the metal chloride solution in a mole ratio being 1.5 times the stoichiometric amount of the metal chloride. After more than 10 hours, preferably 10 to 20 hours of reaction, the metal chlorides are reduced to form colloidal nano-sized particles of platinum alloy.

Subsequently, according to the platinum alloy preparation method of the present invention, the solvent is removed to separate the platinum alloy particles. The particles are dispersed in a mixed solvent of benzene and distilled water without heat treatment, and then freeze dried to form powdery platinum alloy particles.

The solvent of the platinum alloy suspension may be removed using a known method. Specifically, a small amount of, for example, 1 to 5 mol of acetone is added to the suspension with stirring to cause the residual boron lithium hydride reductant adsorbed to the surface of the alloy and subjected to a vaporization step at a temperature ranging from 50 to 60° C., thus removing the solvent. In addition, washing the separated alloy particles with ethanol is repeated several times to enhance the washing effect of removing the residual materials.

According to the present invention, the separated platinum alloy particles are dispersed in benzene and then in distilled water of the same quantity as benzene and mixed with ultrasonic pulverization. The mixed solution is rapidly cooled under liquid nitrogen (LN$_2$) and subjected to sublimation of the solvent under vacuum of $10^{-2}$ to $10^{-3}$ torr, thus drying the platinum alloy particles. Benzene is a water-incompatible solvent having a high melting point of 5.4° C. and an ability of dispersing the non-aqueous platinum alloy particles, and selected due to its high affinity with the catalyst. Distilled water is used to enhance dispersability of the platinum alloy particles. This step also enhance the dispersability of the catalyst particles in porous carbon black in case of preparation of a platinum alloy catalyst dispersed in a carbon support, i.e., immersed in porous carbon black.

Figure 1:
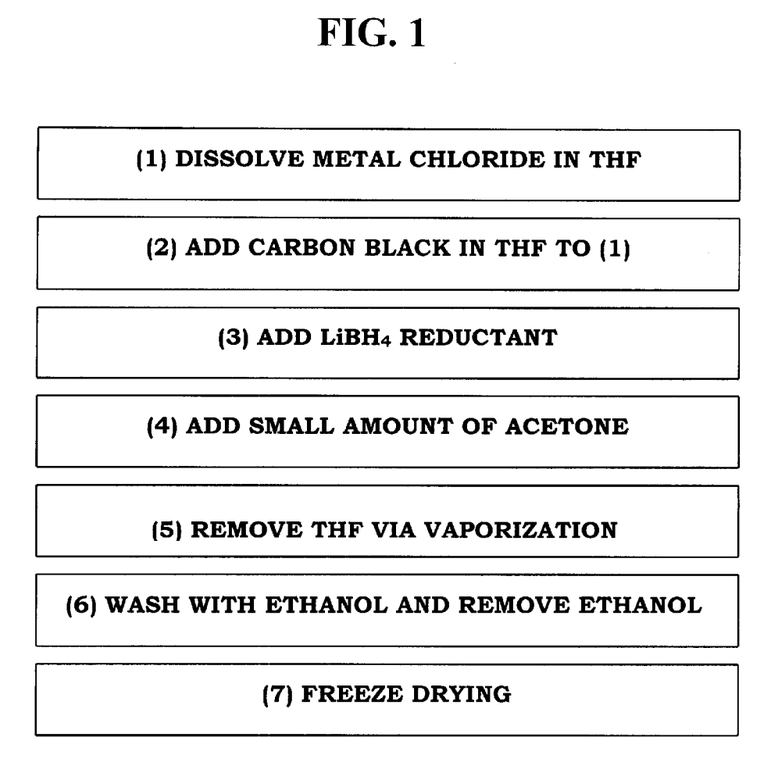
FIG. 1 is a schematic view showing a method of preparing a platinum alloy electrode catalyst for a direct methanol fuel cell, dispersed in a carbon support, according to an embodiment of the present invention.

FIG. 1 is a schematic view showing a method of preparing a platinum alloy electrode catalyst for a direct methanol fuel cell, dispersed in a carbon support, according to an embodiment of the present invention.

According to the platinum alloy preparation method of the present invention, platinum alloy particles having a narrow range of size distribution and an average particle size of less than 2.0 nm can be produced in a simple way relative to the conventional methods. The platinum alloy particles thus obtained are used as an electrode catalyst for DMFC, which is a non-pollutant energy source, to enhance the oxidation performance of the methanol.

Hereinafter, the present invention will be described in further detail by way of the following examples, which are not intended to limit the present invention.

EXAMPLE 1:

Preparation of Platinum-ruthenium Alloy in Carbon

An alloy catalyst of platinum and ruthenium (in an atomic ratio of 1:1) in porous carbon black was prepared in a glove box maintaining the nitrogen atmosphere.

First, 4.0 g of platinum chloride (PtCl$_2$, 98%) was dissolved in 200 ml of tetrahydrofuran (THF). A ruthenium chloride solution containing 0.3057 g of ruthenium chloride (RuCl$_3$) dissolved in 100 ml of THF was added to the platinum chloride solution such that the atomic ratio of platinum to ruthenium was 1:1. After 5 hours of dissolution, the mixed solution was partially heated to 50° C. with stirring.

0.6636 g of carbon black powder (Vulcan XC-72) was dispersed in 100 ml of THF to have a weight ratio of catalyst to carbon support being 40:60. The dispersion was then mixed with the metal chloride solution and stirred for 5 hours. Subsequently, the mixture was continuously stirred at 700 rpm and 110 ml of a 0.1M boron lithium hydride (LiBH$_4$) solution (in THF) was added in a rate of one drop per second and reacted sufficiently for 12 hours.

After completion of the reaction, 3 ml of acetone was added to the suspension containing the platinum-ruthenium alloy particles and the mixture was stirred for 5 hours, followed by removal of the solvent by way of a vaporizer. The dried platinum-ruthenium alloy particles were washed with 150 ml of ethanol, the residual of which was then removed with vaporization. For the ethanol-based washing step, the mixture of the particles and ethanol was stirred in an ultrasonic pulverizer for 30 seconds, and after an elapse of 10 hours, the clear ethanol over the precipitate was discarded.

Subsequently, the platinum-ruthenium alloy particles were dispersed in 30 ml of benzene and then in distilled water of the same quantity as benzene, mixed with ultrasonic pulverization, and rapidly cooled down under liquid nitrogen. The solvent was sublimation under vacuum of to $10^{-2}$ to $10^{-3}$ torr, thus obtaining 1.106 g of platinum-ruthenium alloy particles in carbon (Pt—Ru/C).

EXAMPLE 2:

Preparation of Platinum-molybdenum Alloy in Carbon

The procedures were performed in the same manner as described in Example 1, excepting that 0.3043 g of molybdenum chloride (MoCl$_3$, 98%) was used instead of 0.3057 g of ruthenium chloride (RuCl$_3$), and 0.6565 g of carbon black powder was added, thus yielding 1.0942 g of platinum-molybdenum alloy particles in carbon (Pt—Mo/C).

EXAMPLE 3:

Preparation of Platinum-nickel Alloy in Carbon

The procedures were performed in the same manner as described in Example 1, excepting that 0.1910 g of nickel chloride (NiCl$_3$, 99.99%) was used instead of 0.3057 g of ruthenium chloride (RuCl$_3$), and 0.5610 g of carbon black powder was added, thus yielding 1.0395 g of platinum-nickel alloy particles in carbon (Pt—Ni/C).

EXAMPLE 4:

Preparation of Platinum-tungsten Alloy in Carbon

The procedures were performed in the same manner as described in Example 1, excepting that 0.4948 g of tungsten chloride (WCl$_4$, 97%) was used instead of 0.3057 g of ruthenium chloride (RuCl$_3$), and 0.8376 g of carbon black powder was added, thus yielding 1.3960 g of platinum-tungsten alloy particles in carbon (Pt—W/C).

EXAMPLE 5:

Preparation of Platinum-ruthenium Alloy not in Carbon

First, 0.15 g of platinum chloride (PtCl$_2$, 98%) was dissolved in 150 ml of THF. A ruthenium chloride solution containing 0.115 g of ruthenium chloride (RuCl$_3$) dissolved in 100 ml of THF was added to the platinum chloride solution. After 5 hours of dissolution, the mixed solution was partially heated to 50° C. with stirring. Subsequently, the mixed solution was continuously stirred at 700 rpm, and 41.45 ml of a 0.1 M boron lithium hydride (LiBH$_4$) solution (in THF) was added in a rate of one drop per second and reacted sufficiently for 12 hours.

After completion of the reaction, the same procedures as described in Example 1 were performed to yield 0.166 g of platinum-ruthenium alloy particles (Pt—Ru).

Figure 2:
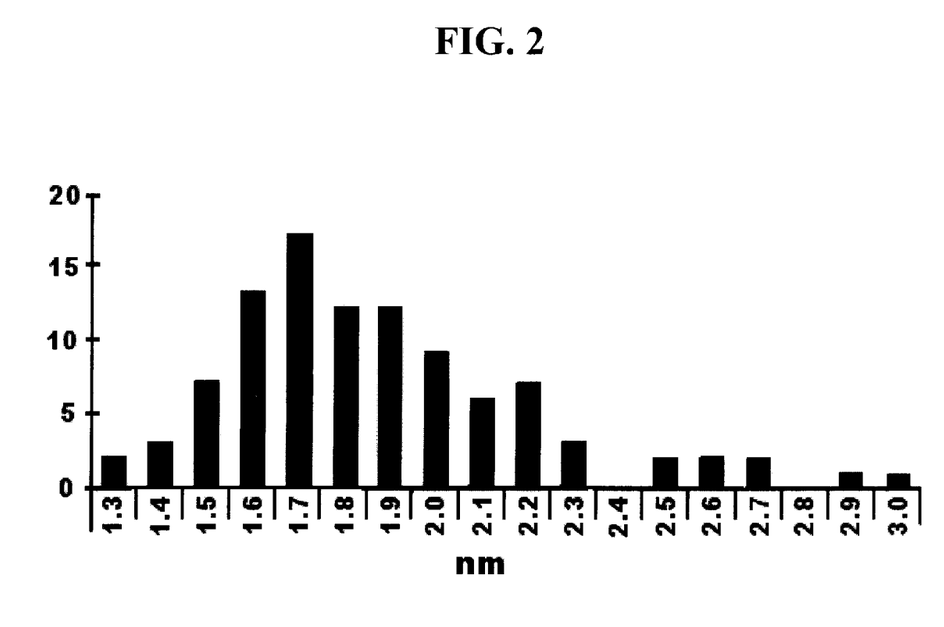
FIG. 2 is a θ–2θ curve obtained in the X-ray diffraction (XRD) analysis of the platinum-ruthenium (Pt—Ru/C) catalyst prepared according to Example 1.

FIG. 2 shows the size distribution of the platinum-ruthenium (Pt—Ru/C) catalyst obtained in Example 1. As shown in FIG. 2, the Pt—Ru/C particles of Example 1 had a small particle size of nearly less than 3 nm and an average particle diameter of 1.85 nm.

Figure 3A:
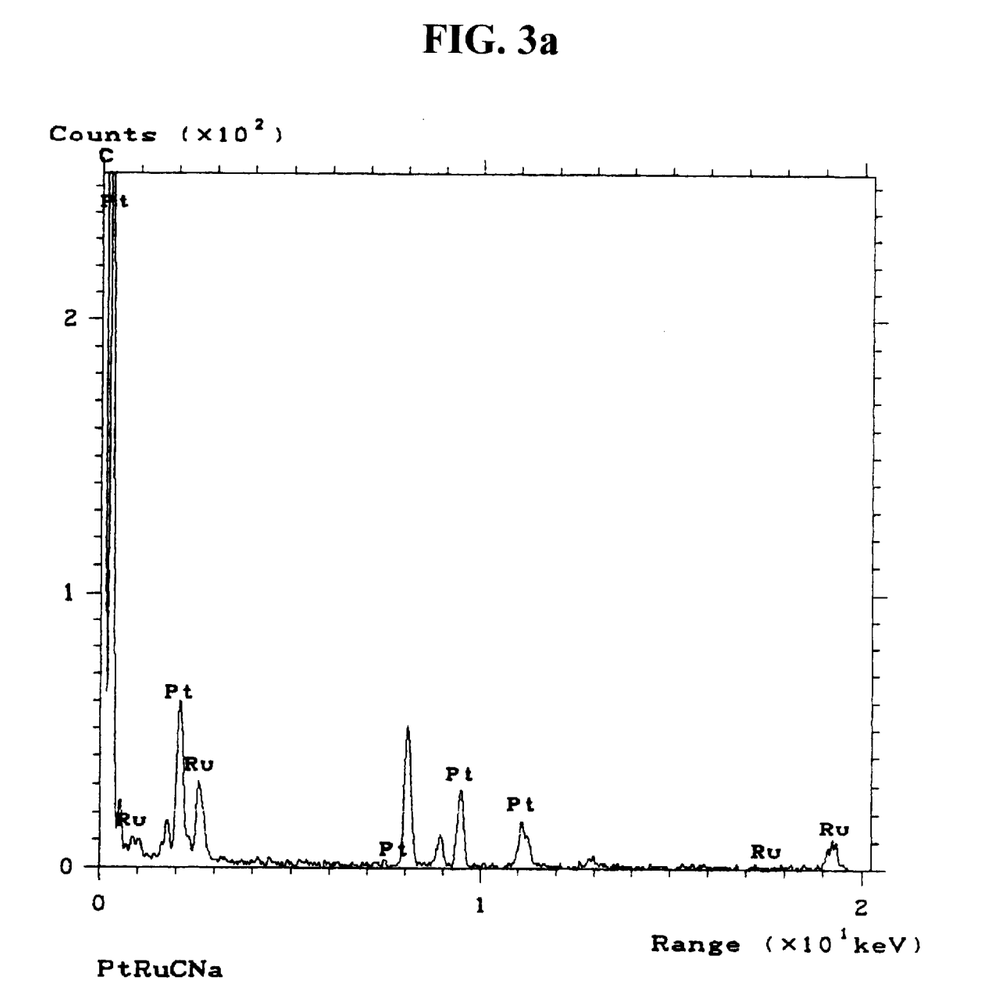
FIGS. 3A and 3B show spectrums of the energy dispersive X-ray spectroscopy (EDX) of the platinum-ruthenium catalysts Pt—Ru/C and Pt—Ru as prepared in Examples 1 and 5, respectively.
Figure 3B:
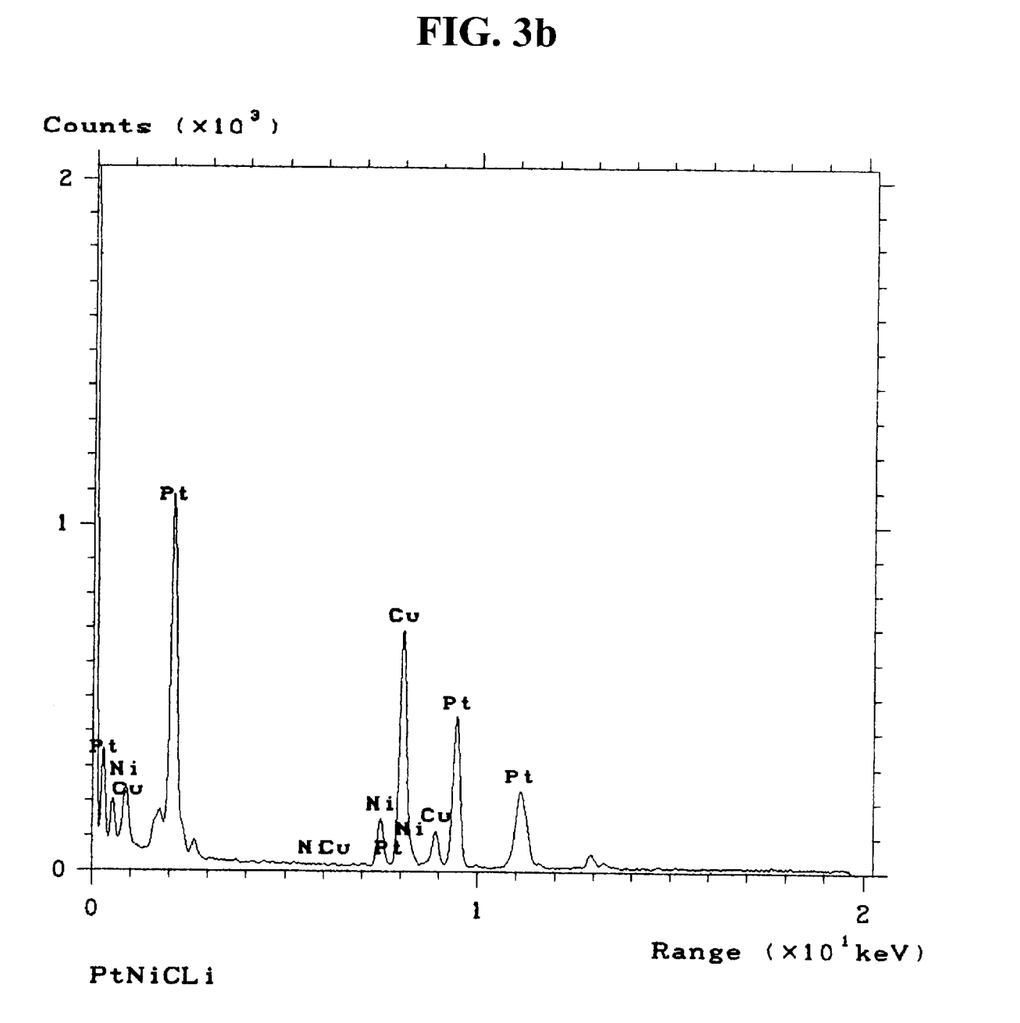

FIGS. 3a and 3b show the results of a quantitative analysis using the energy dispersive X-ray spectroscopy (EDX) of the Pt—Ru/C and Pt—Ru obtained in Examples 1 and 5, respectively. In FIGS. 3a and 3b, it can be seen that the atomic ratio of Pt to Ru is 1:1 as desired.

Figure 4A:
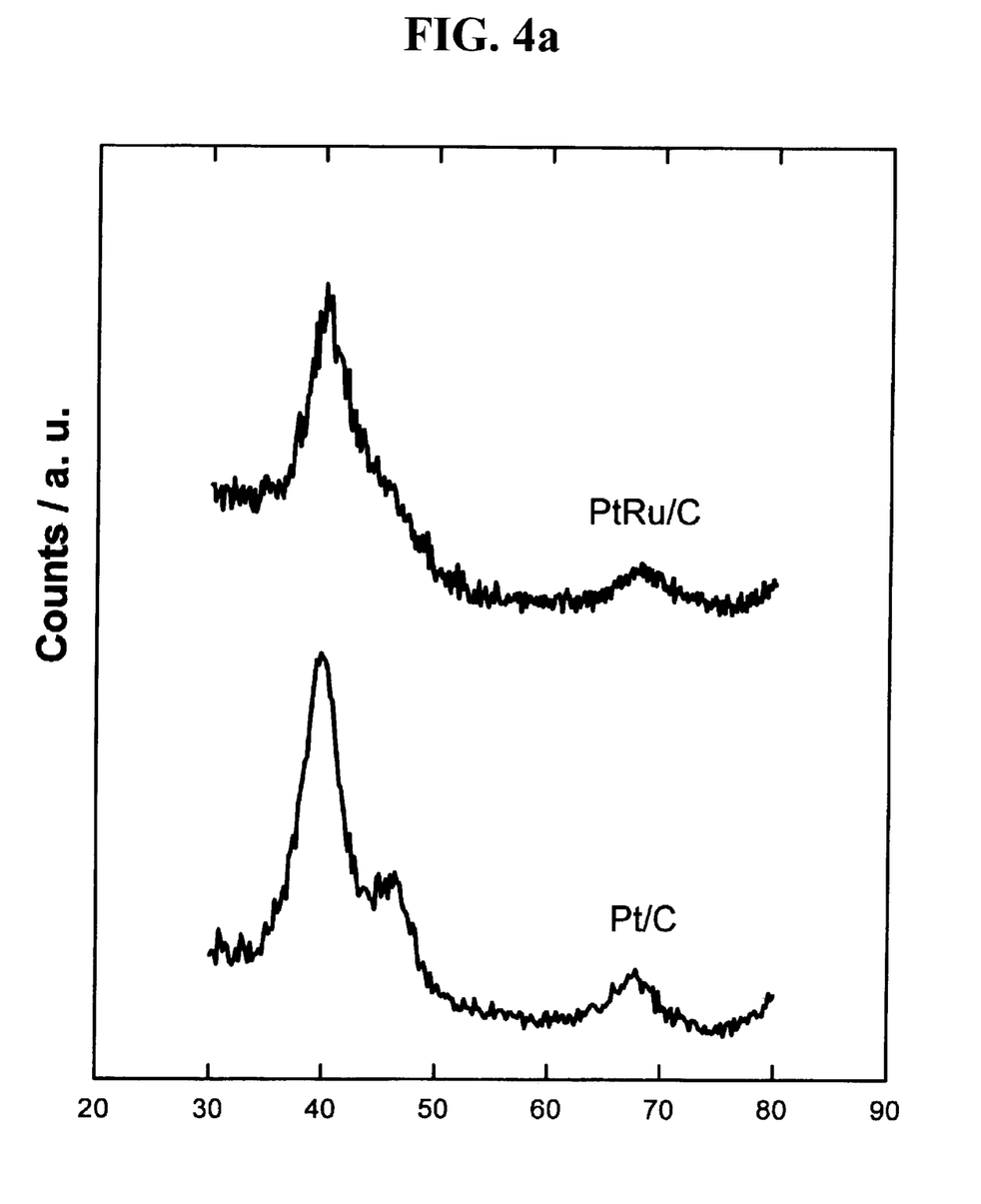
FIGS. 4a, 4b and 4c compare the θ–2θ curve obtained in the XRD analysis of various catalysts Pt—Ru/C, Pt—Mo/C and Pt—Ru as prepared in Examples 1, 2 and 5, respectively, with a curve of a platinum powder (Pt/C)
Figure 4B:
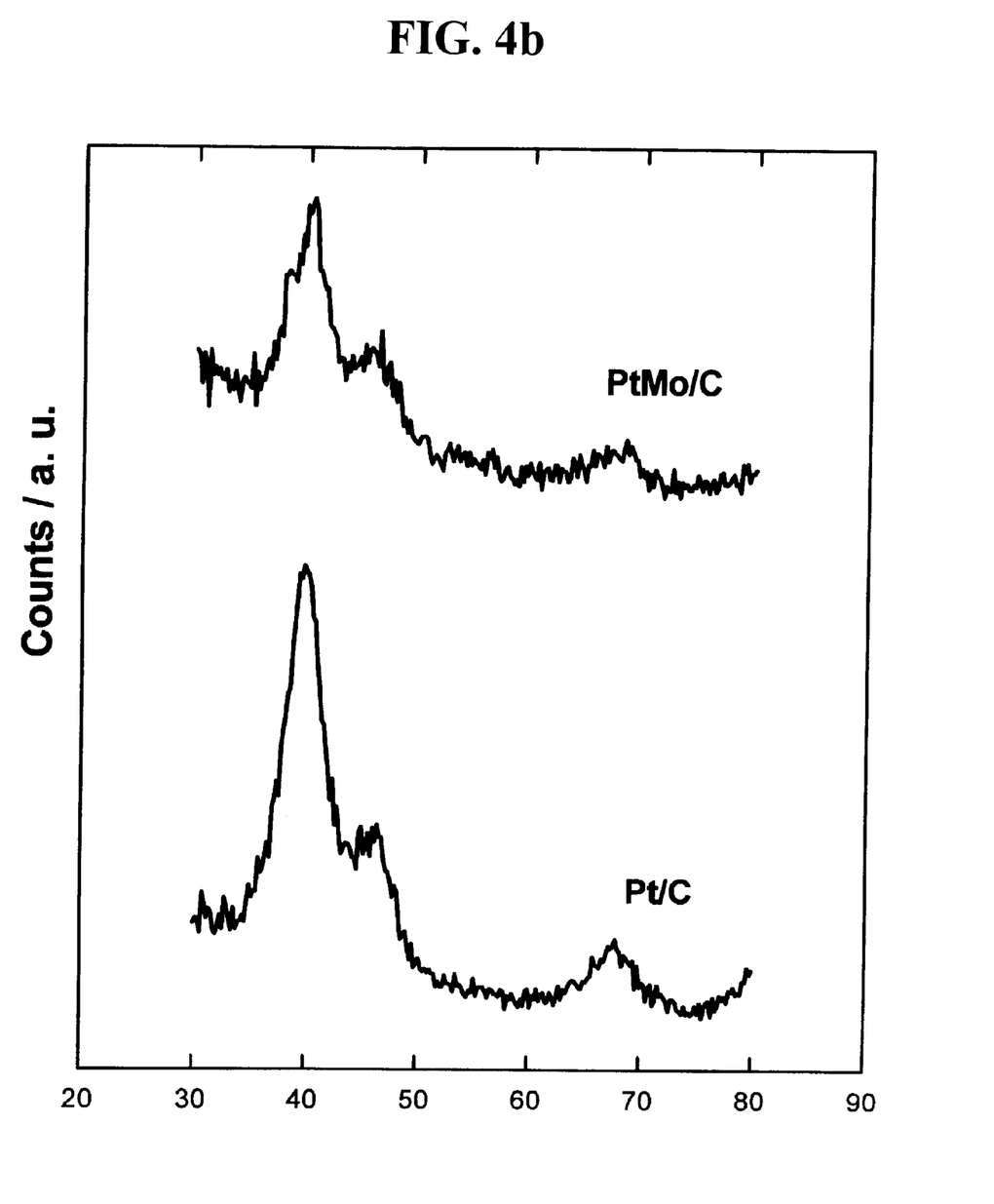
Figure 4C:
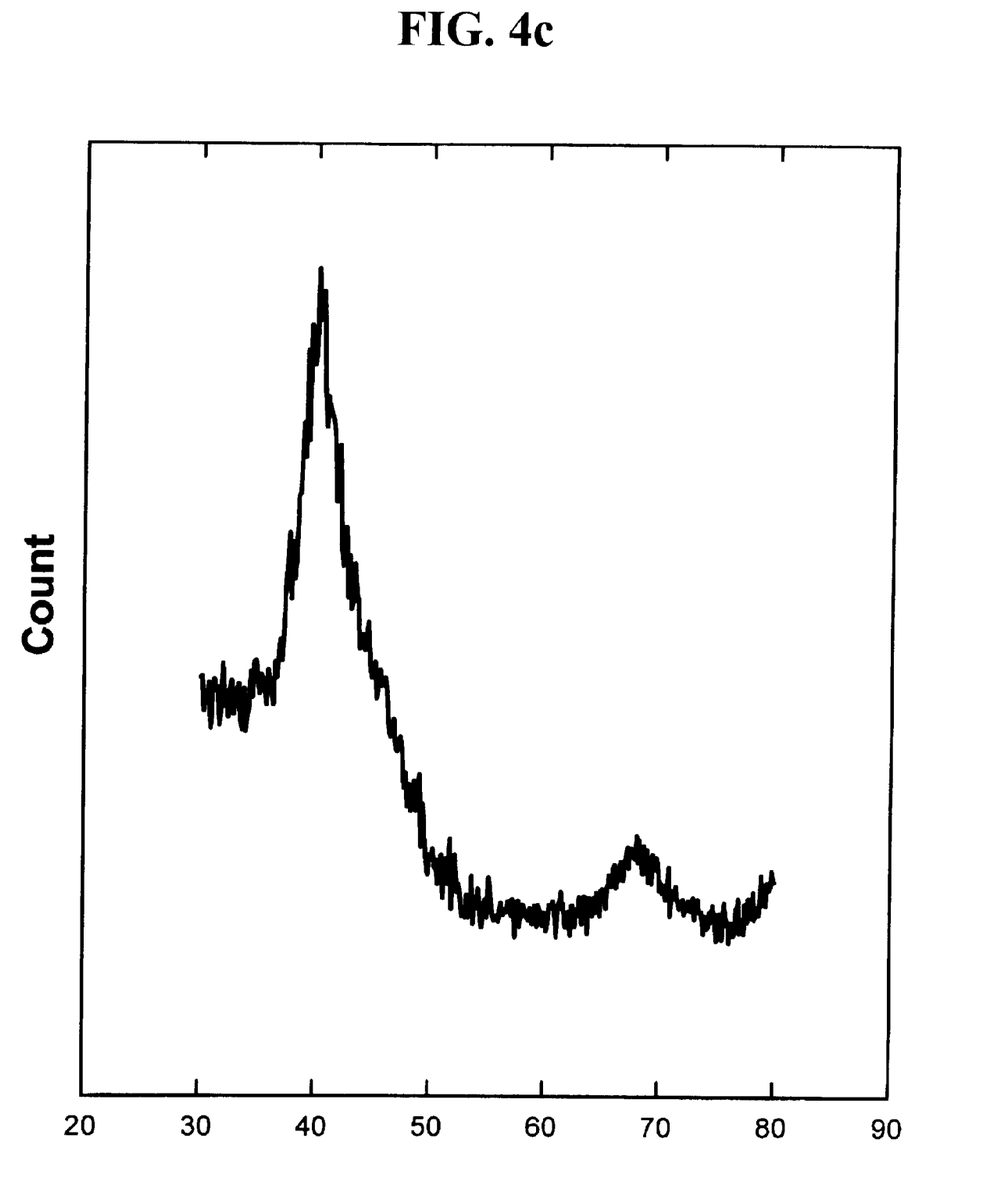

FIGS. 4a, 4b and 4c show the θ–2θ curves obtained in the XRD analysis of Pt—Ru/C, Pt—Mo/c and Pt—Ru catalysts as prepared in Examples 1, 2 and 5, respectively. In particular, FIGS. 4a and 4b compare the above curves with the curve of platinum powder (Pt/C). As is apparent from the figures, the peak corresponding to the platinum (111) crystal in the alloy slightly shifted to the right side, which means the production of ruthenium or molybdenum alloy.

Figure 5A:
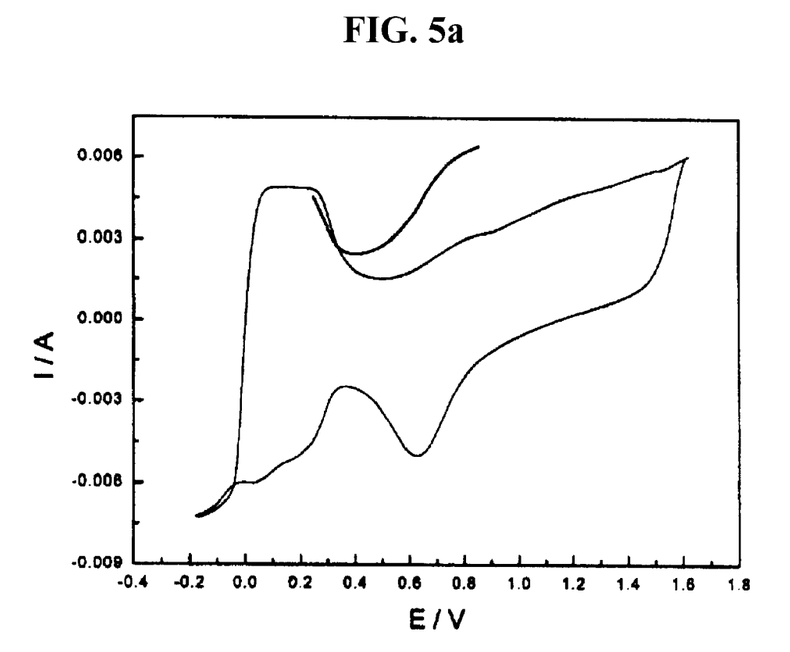
FIGS. 5a, 5b and 5c show cyclic voltammograms of the catalysts Pt—Ru/C and Pt—Mo/C prepared according to Examples 1 and 2, respectively, and a conventional catalyst Pt—Ru/C commercially available from E-TEK Co. (U.S.A).
Figure 5B:
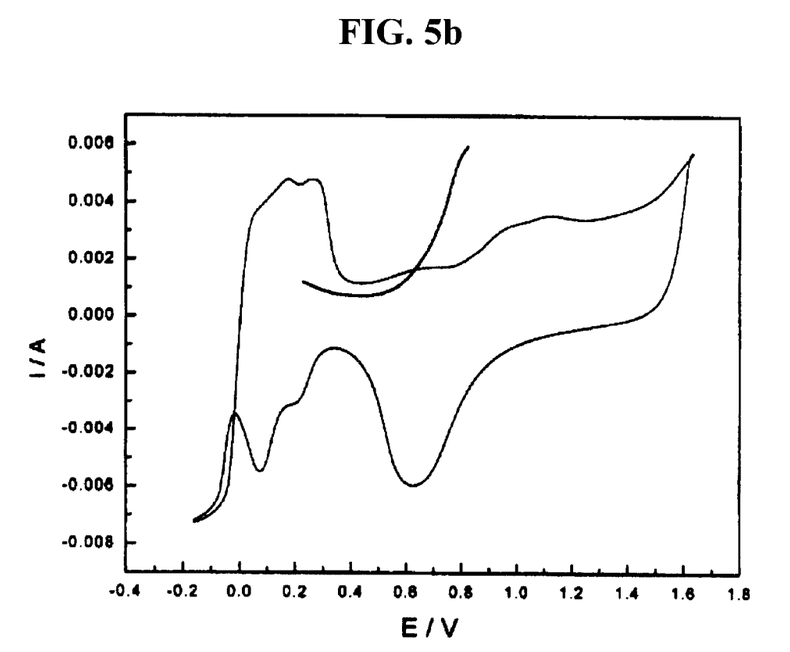
Figure 5C:
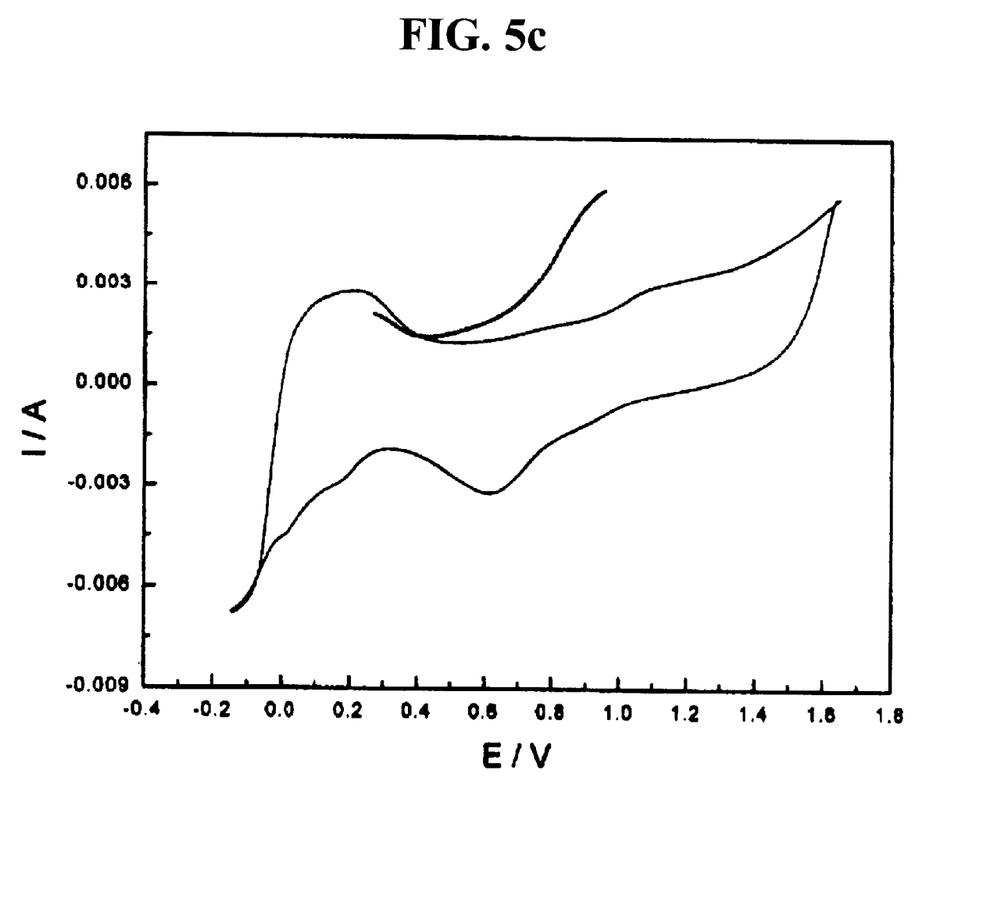

FIGS. 5a, 5b and 5c show cyclic voltammograms of the catalysts Pt—Ru/C and Pt—Mo/c prepared according to Examples 1 and 2, respectively, and a conventional catalyst Pt—Ru/C(60 wt. %) commercially available from E-TEK Co. (U.S.A). The cyclic voltammograms represent the electrochemical properties (methanol oxidizing characteristic in a solution of sulfuric acid and methanol) of the catalysts, and show that the catalysts Pt—Ru/C and Pt—Mo/c obtained in Examples 1 and 2, respectively, are useful as an electrode catalyst for DMFC.

As described above, the method of preparing a platinum alloy catalyst according to the present invention makes it possible to prepare platinum alloy particles having a narrow range of size distribution and an average particle size of less than 2 nm with ease relative to the conventional methods. The platinum alloy particles thus obtained can be used as an electrode catalyst for DMFC to enhance the methanol oxidation performance.

What is claimed is:

1. A method of preparing a platinum alloy electrode catalyst for a direct methanol fuel cell, comprising the steps of:

dissolving platinum chloride in an organic water-incompatible solvent to form a platinum chloride solution;

dissolving a non-aqueous second metal chloride in said organic water-incompatible solvent to form a second metal chloride solution;

mixing said platinum chloride solution and said second metal chloride solution to form a third solution;

reducing said third solution by adding a boron lithium hydride solution to said third solution to form platinum alloy particles having an average particle size of less than 2 nm;

separating said platinum alloy particles from said reduced third solution; and, freeze drying said platinum alloy particles by dispersing said platinum alloy particles in a mixed solvent of benzene and distilled water.

2. The method as claimed in claim 1, wherein said third solution includes said platinum chloride and said non-aqueous second metal chloride added to said organic water-incompatible solvent in an atom ratio of platinum to said second metal being 1~2:1.

3. The method as claimed in claim 1, wherein said organic water-incompatible solvent is selected from the group consisting of tetrahydrofuran, acetonitrile, pyridine, dimethylformamide, and mixtures thereof.

4. The method as claimed in claim 1, wherein said second metal chloride includes transition metal chlorides.

5. The method as claimed in claim 1, wherein a carbon black powder is added to said organic water-incompatible solvent prior to reducing said third solution.

6. The method as claimed in claim 1, wherein said platinum alloy particles are dispersed in benzene and then in distilled water of a quantity equal to that of said benzene.

7. The method as claimed in claim 1, wherein said boron lithium hydride solution is a 0.01 to 0.5 M solution of boron lithium hydride.

8. A method of preparing a platinum alloy electrode catalyst for a direct methanol fuel cell, comprising the steps of:

dissolving platinum chloride in an organic water-incompatible solvent to form a platinum chloride solution;

dissolving a non-aqueous second metal chloride in said organic water-incompatible solvent to form a second metal chloride solution;

mixing said platinum chloride solution and said second metal chloride solution to form a third solution;

reducing said third solution by adding a boron lithium hydride solution to said third solution to form platinum alloy particles having an average particle size of less than 2 nm; and, drying said platinum alloy particles.

* * * * *